US012658618B2

(12) United States Patent
Dai et al.

(10) Patent No.: US 12,658,618 B2
(45) Date of Patent: Jun. 16, 2026

(54) BOARD END CONNECTOR FOR FLEXIBLE CONNECTION WITH PCB

(71) Applicant: Phoenix Contact Asia-Pacific (Nanjing) CO., LTD., Nanjing (CN)

(72) Inventors: Haiqiong Dai, Nanjing (CN); Huawei Song, Nanjing (CN)

(73) Assignee: Phoenix Contact Asia-Pacific (Nanjing) CO., LTD., Nanjing (CN)

( * ) Notice: Subject to any disclaimer, the term of this patent is extended or adjusted under 35 U.S.C. 154(b) by 301 days.

(21) Appl. No.: 18/559,257

(22) PCT Filed: Mar. 17, 2022

(86) PCT No.: PCT/CN2022/081470
§ 371 (c)(1),
(2) Date: Nov. 6, 2023

(87) PCT Pub. No.: WO2022/233188
PCT Pub. Date: Nov. 10, 2022

(65) Prior Publication Data

US 2024/0235077 A1 Jul. 11, 2024

(30) Foreign Application Priority Data

May 6, 2021 (CN) ......................... 202110490995.4

(51) Int. Cl.
*H01R 12/71* (2011.01)
*H01R 12/58* (2011.01)
(Continued)

(52) U.S. Cl.
CPC ........... *H01R 12/716* (2013.01); *H01R 12/58* (2013.01); *H01R 13/502* (2013.01); *H01R 13/74* (2013.01); *H01R 13/746* (2013.01); *H01R 12/707* (2013.01)

(58) Field of Classification Search
CPC .... H01R 12/716; H01R 12/58; H01R 13/502; H01R 13/74; H01R 13/746; H01R 12/707; H01R 12/77; Y02E 10/50
See application file for complete search history.

(56) References Cited

U.S. PATENT DOCUMENTS 4,553,322 A 11/1985 Cappos et al.
5,591,039 A 1/1997 Matthews
(Continued)

FOREIGN PATENT DOCUMENTS

CN 103022757 A 4/2013
CN 103066462 A 4/2013
(Continued)

OTHER PUBLICATIONS

International Search Report and Written Opinion of International Application No. PCT/CN2022/081470, dated May 10, 2022, 9 Pages.

*Primary Examiner* — Abdullah A Riyami
*Assistant Examiner* — Nader J Alhawamdeh
(74) *Attorney, Agent, or Firm* — The Roy Gross Law Firm, LLC; Roy D. Gross

(57) ABSTRACT

The present disclosure provides a board-end connector for flexible connection with a PCB. According to the present disclosure, a board-end connector is provided. The board-end connector comprises: an insulating housing with openings at both ends; a locknut, to be used for mated installation with a first end of the insulating housing; and a cover, to be used for mated installation with a second end of the insulating housing by insertion, wherein the cover is configured to receive a first terminal having a soldering tail end and, the cover and the second end of the insulating housing, after the mated installation, are capable of sliding axially and being limited within a predetermined spatial range.

20 Claims, 13 Drawing Sheets

(51) Int. Cl.

| | |
|---|---|
| ***H01R 13/502*** | (2006.01) |
| ***H01R 13/74*** | (2006.01) |
| *H01R 12/70* | (2011.01) |

(56) References Cited

U.S. PATENT DOCUMENTS

| | | | | |
|---|---|---|---|---|
| 8,734,167 | B2 | 5/2014 | Aimoto | |
| 2015/0147911 | A1* | 5/2015 | Logan, Jr. | H01R 12/91<br>29/842 |
| 2018/0054014 | A1* | 2/2018 | Logan, Jr. | H01R 12/91 |
| 2021/0044033 | A1* | 2/2021 | Zhang | H01R 4/30 |
| 2024/0235077 | A1* | 7/2024 | Dai | H01R 13/746 |

FOREIGN PATENT DOCUMENTS

| | | | |
|---|---|---|---|
| CN | 202977789 | U | 6/2013 |
| CN | 203423290 | U | 2/2014 |
| CN | 210897709 | U | 6/2020 |
| CN | 212462109 | U | 2/2021 |
| CN | 113193397 | A | 7/2021 |
| DE | 102014211092 | A1 | 12/2015 |
| EP | 3389144 | A1 | 10/2018 |
| JP | H0831488 | A | 2/1996 |

* cited by examiner

BOARD END CONNECTOR FOR FLEXIBLE CONNECTION WITH PCB

This application is a national stage application under 35 U.S.C. § 371 of International Application No. PCT/CN2022/081470, filed Mar. 17, 2022, which claims priority to Chinese Patent Application No. 202110490995.4, filed May 6, 2021. The entire contents of each of Application Nos. PCT/CN2022/081470 and CN 202110490995.4 are incorporated herein by reference.

TECHNICAL FIELD

The present disclosure relates to a housing body of a board-end connector, in particular to a board-end connector for flexible connection with PCB. Such board-end connector can accommodate different spacings between a PCB inside a device and a mounting panel on a surface of the device.

BACKGROUND

Photovoltaic inverters (PV inverters) are used to convert the DC voltage generated by photovoltaic solar panels into alternating current (AC) that meets the frequency required by the grid. Electrical connectors may be used for wiring between the inverter and the grid.

As the number of the terminals inside the photovoltaic inverter increases, the number of the wire harnesses used for wiring increases correspondingly. When there are too many wire harnesses inside the case of the photovoltaic inverter, it would cause inconvenience in assembly and use. One solution is to use PCBs in the inverter. A variety of the terminals inside the case of the photovoltaic inverter are to be connected to the PCB and lead-out terminals are to be soldered on the PCB, and then a board-end connector mounted to the case of the photovoltaic inverter is to be used to establish electrical connection with the lead-out terminals.

In practice, due to the large tolerance range of the spacing between the panel of the case of the photovoltaic inverter and the PCB, there is a need for a flexible connection between a conductive component inside the board-end connector and the PCB. Conventional designs usually use connection solutions of serpentine springs or soft copper bars. However, the aforesaid solutions cannot completely solve the problem of the pulling force between the conductive components in the board-end connector and the PCB, since the PCB solder joints of the lead-out terminals are still subjected to some of the pulling force. Further, the aforesaid solutions also face the problems of high cost and low current carrying capacity.

SUMMARY

The present disclosure is intended to provide a novel board-end connector assembly, which can provide a flexible connection between a mounting panel on a surface of a device and a PCB inside the device.

According to one aspect of the present disclosure, a board-end connector is provided. The board-end connector comprises: an insulating housing with openings at both ends; a locknut, to be used for mated installation with a first end of the insulating housing; and a cover, to be used for mated installation with a second end of the insulating housing by insertion, wherein the cover is configured to receive a first terminal having a soldering tail end and, the cover and the second end of the insulating housing, after the mated installation, are capable of sliding axially and being limited within a predetermined spatial range.

In the aforesaid board-end connector, the second end of the insulating housing is provided with an annular boss, and a first limiting structure is provided at an inner side of the cover while a mating second limiting structure is provided at an outer side of the annular boss, and after the cover is sleeved and mounted onto the annular boss, a physical interference of the first limiting structure and the second limiting structure prevents the cover from disengaging from the annular boss.

In the aforesaid board-end connector, when a bottom of the cover is in contact with a top of the annular boss, the first limiting structure is to be in no contact with the second limiting structure.

In the aforesaid board-end connector, the first limiting structure comprises limiting protrusion(s) at the inner side of the cover while the second limiting structure comprises limiting recess(es) at the outer side of the annular boss, and after the cover is sleeved and mounted onto the annular boss, the limiting recess(es) is to receive the limiting protrusion(s) and to allow for an axial movement of the limiting protrusion(s) within the limiting recess(es).

In the aforesaid board-end connector, a first guide structure is provided on the annular boss while a mating second guide structure is provided on the cover, and mating of the first guide structure and the second guide structure is to allow for axial relative sliding between the cover and the insulating housing, with a restriction on circumferential relative rotation therebetween.

In the aforesaid board-end connector, the first guide structure comprises guiding slot(s), and the second guide structure comprises guiding post(s).

In the aforesaid board-end connector, the soldering tail end of the first terminal is flat shaped, the soldering tail end of the first terminal is larger in width than an insertion body of the first terminal, the cover is provided with a terminal socket in the middle of the cover, and the terminal socket is provided with a pin guiding and limiting structure therein to assist in installation guide of the insertion body of the first terminal and to limit an insertion depth of the soldering tail end of the first terminal.

In the aforesaid board-end connector, a first ledge structure is provided in the terminal socket while a second ledge structure is provided at the soldering tail end of the first terminal, and the first ledge structure and the second ledge structure are to be mated with each other to retain the first terminal.

In the aforesaid board-end connector, the board-end connector comprises a conductive sleeve to be mounted in the insulating housing, and one end of the conductive sleeve is to be used for mated connection with an insertion body of the first terminal while the other end of the conductive sleeve is to be used for connection with a terminal in a mating connector.

In the aforesaid board-end connector, the conductive sleeve is provided with an elastic coupling member therein, to establish a slidable electrical connection between an inner wall of the sleeve and the insertion body of the first terminal when inserted into the sleeve.

In the aforesaid board-end connector, the elastic coupling member is a crown spring, a torsion spring, a wire spring, a claw, or a leaf spring.

In the aforesaid board-end connector, the first end of the insulating housing corresponds to an end of the board-end connector to be inserted with a mating connector.

In the aforesaid board-end connector, the insulating housing is to be positioned on one side of a mounting panel and pass through a positioning hole in the mounting panel, and the locknut is to lock the insulating housing to the other side of the mounting panel.

According to one aspect of the present disclosure, a photovoltaic inverting device is provided. The photovoltaic inverting device comprises a device case, a PCB, and the aforesaid board-end connector, wherein the PCB is to be positioned inside the device case, and the soldering tail end of the first terminal of the board-end connector is to be soldered onto the PCB while the insulating housing of the board-end connector is to be mounted onto a panel of the device case.

The beneficial effects achieved by the present disclosure include at least: by enabling the insulating housing and the cover of the board-end connector to slide axially and be limited within a predetermined spatial range, the board-end connector can accommodate different spacings between the mounting panel and the PCB, thereby achieving an axial flexible connection between the soldering terminal of the PCB and the conductive component inside the connector, and allowing for a larger tolerance. The realization of this flexible tolerance connection in turn solves the problem of the pulling force exerted on the PCB solder joint by the conductive component in the board-end connector.

Figure 1:
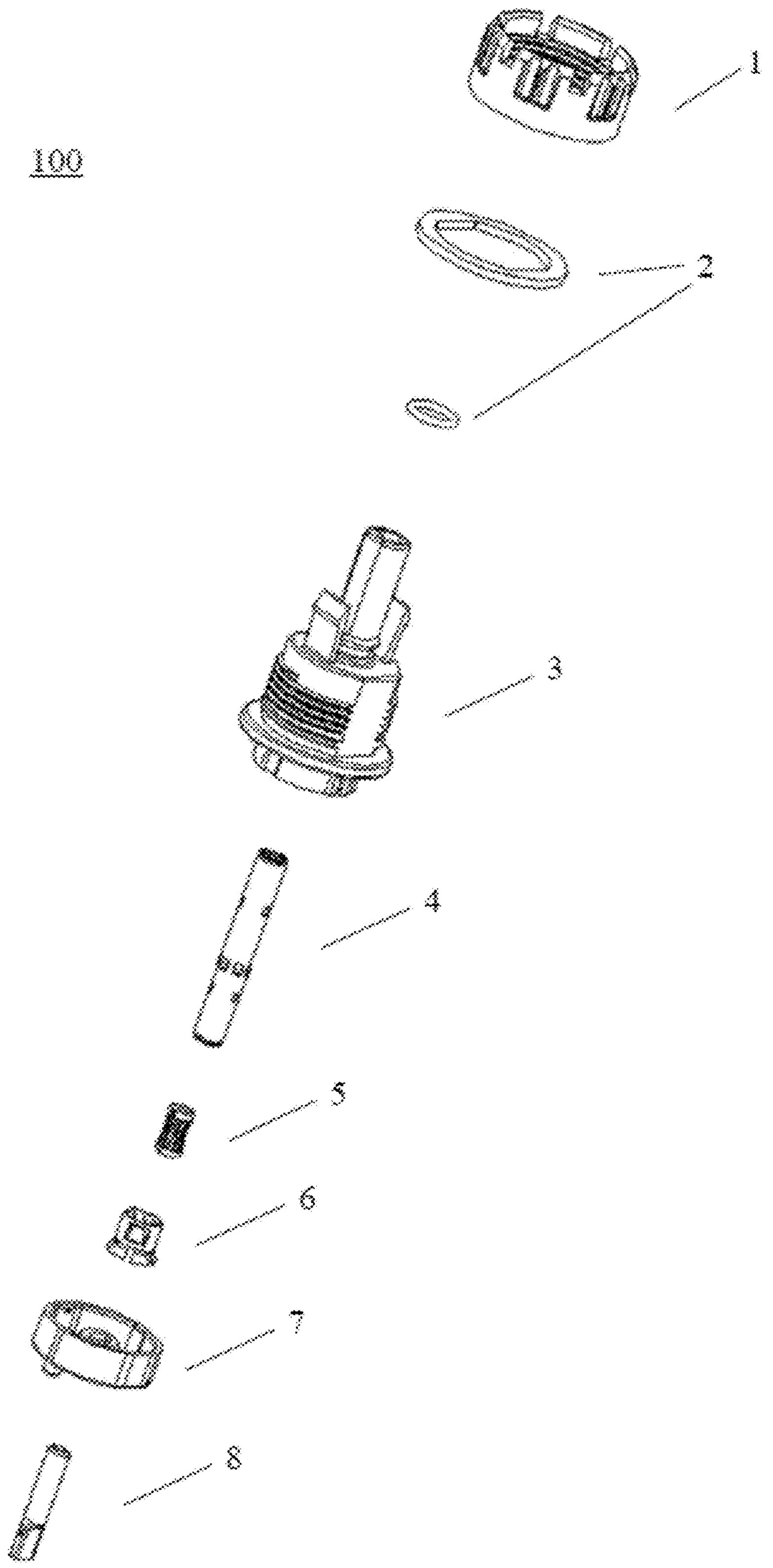
FIG. 1 shows a schematic exploded view of a board-end connector according to an example of the present disclosure.

Some of the reference numerals:

100 board-end connector; 1 locknut; 3 insulating housing; 4 conductive sleeve; 5 crown spring; 6 retaining ring; 7 cover; 71 terminal socket; 72 pin guiding and limiting structure; 75 stop ledge; 8 pin terminal; 81 soldering tail end; 82 insertion body; 85 stop ledge; 722 protrusion; 322 guiding slot; 32 annular boss; 73 first limiting structure; 35 second limiting structure; 735 limiting protrusion; 325 limiting recess.

DETAILED DESCRIPTION

In the following description, the present disclosure is described with reference to various examples. However, one skilled in the art will recognize that the various examples may be practiced without one or more of the specific details or with other alternative and/or additional methods, materials, or components. In other instances, well-known structures, materials, or operations have not been illustrated or described in detail so as not to obscure aspects of the various examples of the present disclosure. Likewise, for purposes of explanation, specific quantities, materials, and configurations are set forth in order to provide a thorough understanding of the examples of the present disclosure. However, the present disclosure may be practiced without the specific details. In addition, it should be understood that the examples shown in the drawings are illustrative representations and are not necessarily drawn to scale.

FIG. 1 shows a schematic exploded view of a board-end connector according to an example of the present disclosure. As shown in FIG. 1, a board-end connector 100 may be comprised of a locknut 1, a sealing washer 2, an insulating housing 3, a conductive sleeve 4, a crown spring 5, a retaining ring 6, a cover 7, and a pin terminal 8, wherein the board-end connector 100 refers to a connector which may be mounted to a panel. For example, as to a photovoltaic inverting device in a photovoltaic system, if the board-end connector 100 is to be mounted to the device case of the photovoltaic inverting device, a certain surface of the device case is to be the mounting panel for the board-end connector 100. In this sense, the board-end connector 100 may also be referred to as a device-end connector.

The pin terminal 8 has a soldering tail end to be soldered to a PCB. The pin terminal 8 may thus also be referred to as a soldering terminal. The other end of the pin terminal 8 may be inserted into the corresponding socket of the cover 7 to form a soldering terminal assembly. The relevant structure of such assembly will be described below in connection with FIGS. 2-5.

Figure 2:
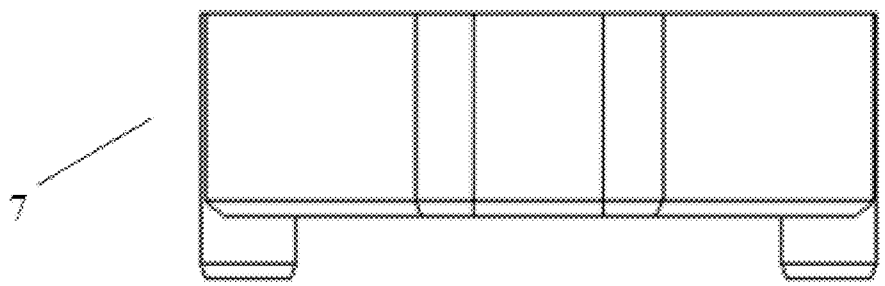
FIG. 2 shows a schematic view of a cover according to an example of the present disclosure.
Figure 3:
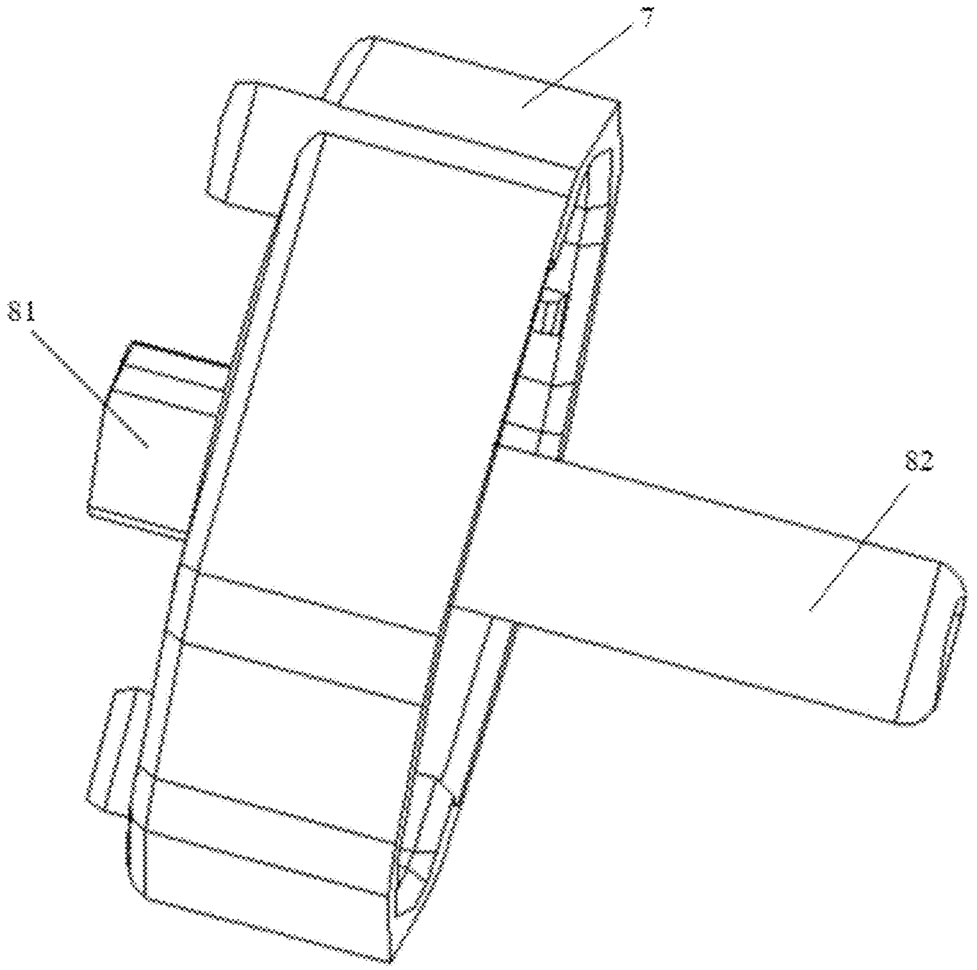
FIG. 3 shows a schematic view of an assembly of cover and pin terminal according to an example of the present disclosure.
Figure 4:
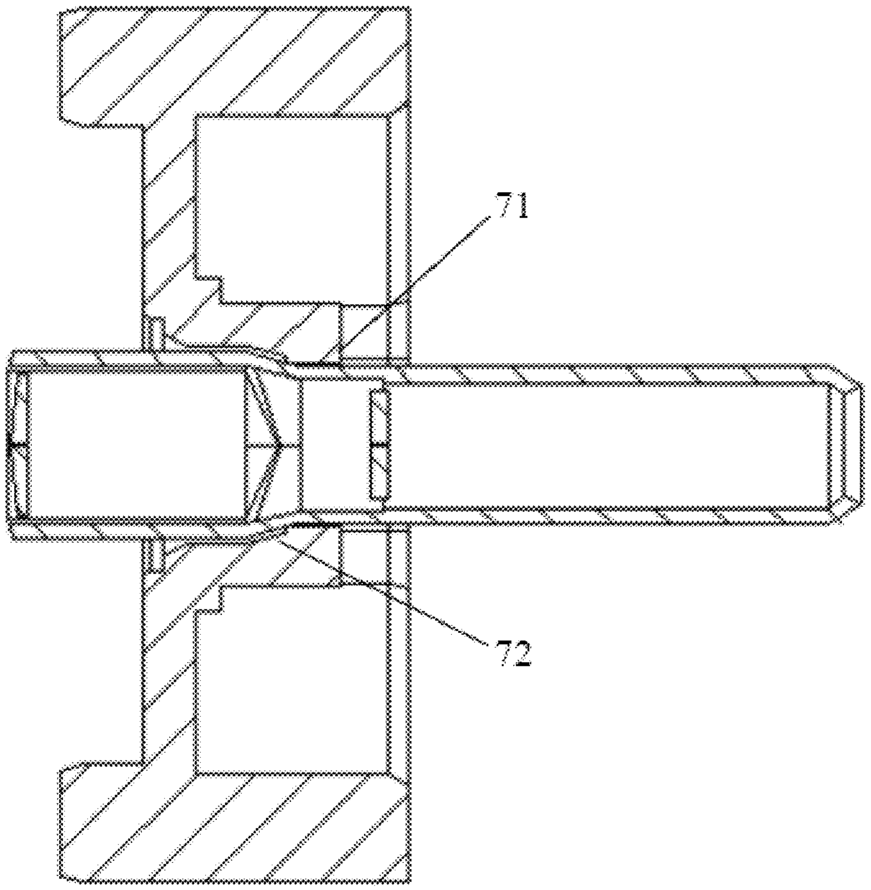
FIG. 4 shows a cross-sectional view of an assembly of cover and pin terminal according to an example of the present disclosure.
Figure 5:
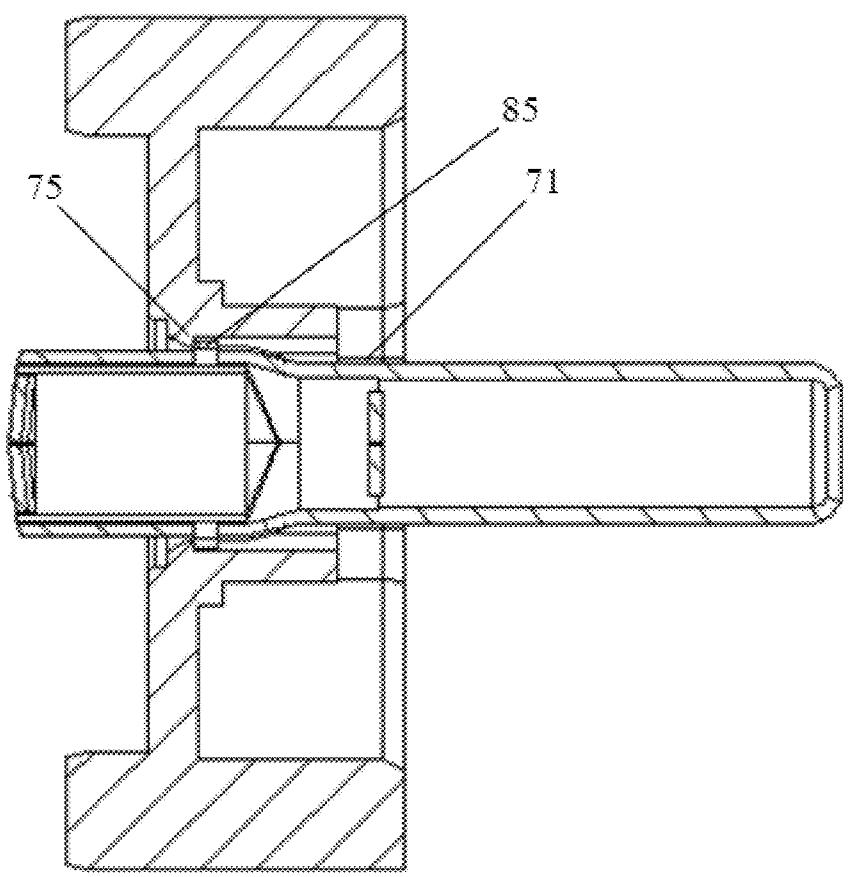
FIG. 5 shows a cross-sectional view, taken along another direction, of an assembly of cover and pin terminal according to an example of the present disclosure.

FIG. 2 shows a schematic view of the cover 7 according to an example of the present disclosure. FIG. 3 shows a schematic view of an assembly of the cover 7 and the pin terminal 8 according to an example of the present disclosure. FIG. 4 shows a cross-sectional view of an assembly of the cover 7 and the pin terminal 8 according to an example of the present disclosure. FIG. 5 shows a cross-sectional view, taken along another direction, of an assembly of the cover 7 and the pin terminal 8 according to an example of the present disclosure. The cross-sections of FIG. 4 and FIG. 5 are taken along different angular directions. As shown in FIGS. 3-5, the pin terminal 8 may be inserted from an end of the cover 7 into the corresponding socket of the cover. The soldering tail end 81 of the pin terminal 8 is flat shaped, and the soldering tail end 81 is larger in width than an insertion body 82 at the front of the pin terminal 8. The cover 7 is provided with a terminal socket 71 in the middle of the cover. The terminal socket 71 is provided with a pin guiding and limiting structure 72 therein, to assist in the installation guide of the insertion body 82 of the pin terminal 8, and to limit the insertion depth of the soldering tail end 81 of the pin terminal 8. As an example, the pin guiding and limiting structure 72 may be a limiting hole that gradually narrows along the axial direction as shown in FIG. 4. In addition, as shown in FIG. 5, a stop ledge 75 is provided in the terminal socket 71, and a stop ledge 85 is provided at the soldering tail end 81 of the pin terminal 8. The stop ledge 75 and the stop ledge 85 are to be mated with each other to retain the pin terminal 8.

Figure 6:
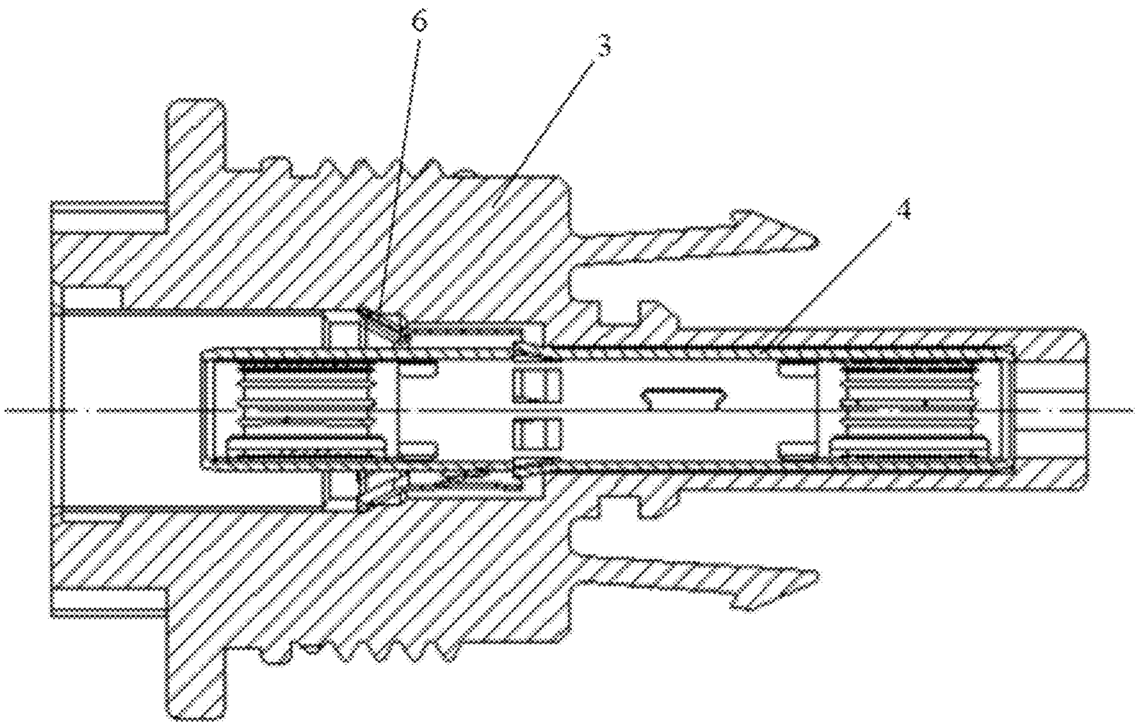
FIG. 6 shows a cross-sectional view of an assembly of insulating housing and conductive sleeve of the board-end connector according to an example of the present disclosure.
Figure 7A:
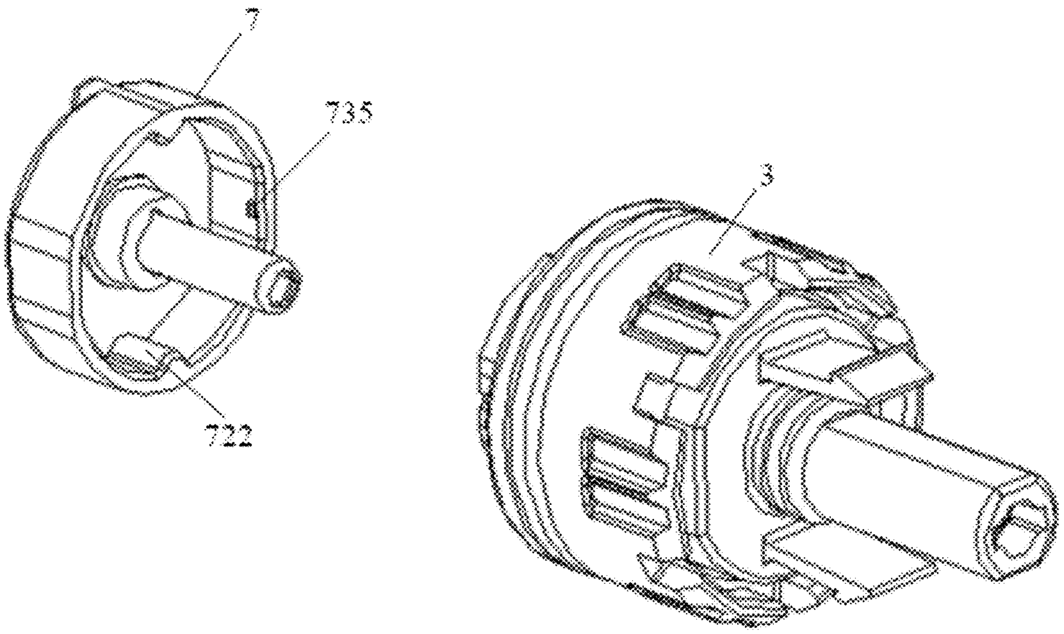
FIG. 7A shows a schematic view of an assembly of cover and pin terminal and an assembly of insulating housing and conductive sleeve, with the guiding post structure illustrated, according to an example of the present disclosure.
Figure 7B:
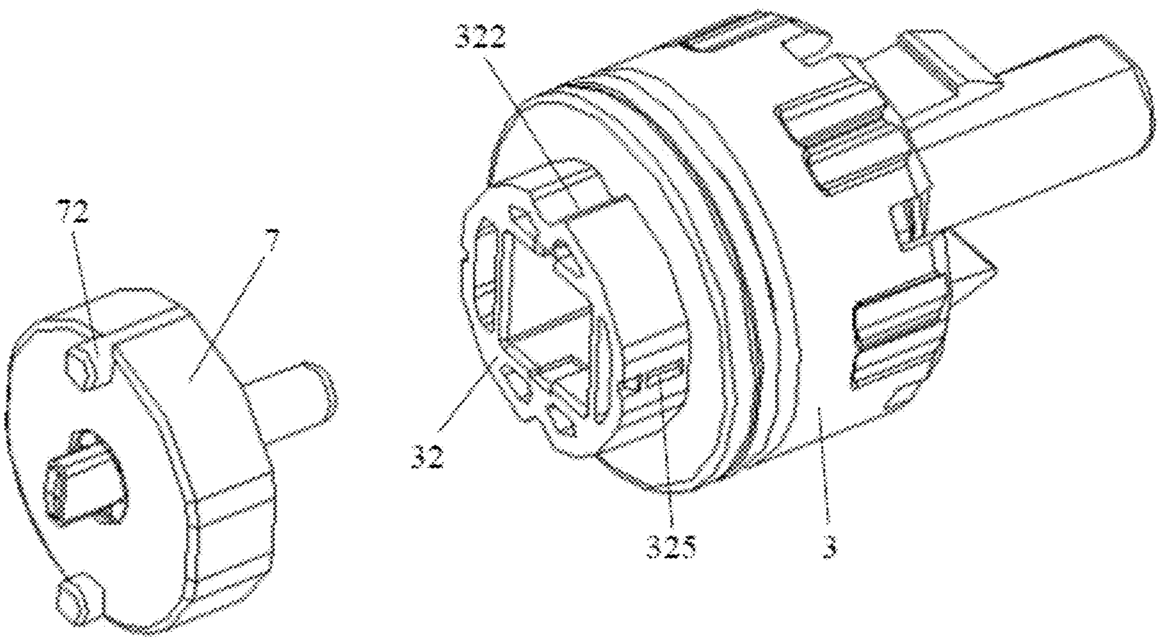
FIG. 7B shows a schematic view, from another perspective, of the assembly of cover and pin terminal and the assembly of insulating housing and conductive sleeve, with the guiding slot structure illustrated, according to an example of the present disclosure.
Figure 8:
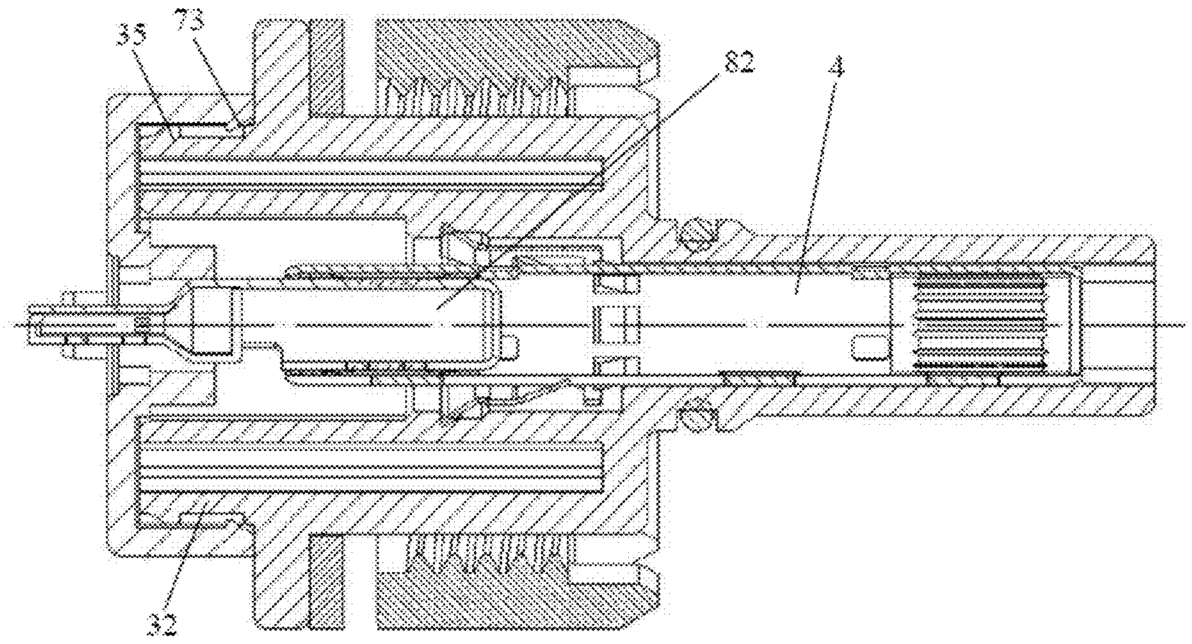
FIG. 8 shows a cross-sectional view of the assembly of cover and pin terminal and the assembly of insulating housing and conductive sleeve in a mated installation state.

FIG. 6 shows a cross-sectional view of an assembly of the insulating housing 3 and the conductive sleeve 4 of the board-end connector according to an example of the present disclosure. FIG. 7A shows a schematic view of an assembly of the cover 7 and the pin terminal 8 (i.e., the soldering terminal assembly) and an assembly of the insulating housing 3 and the conductive sleeve 4, with the guiding post structure 722 illustrated, according to an example of the present disclosure. FIG. 7B shows a schematic view, from another perspective, of the assembly of the cover 7 and the pin terminal 8 and the assembly of the insulating housing 3 and the conductive sleeve 4, with the guiding slot structure 322 illustrated, according to an example of the present disclosure. FIG. 8 shows a cross-sectional view of the assembly of the cover 7 and the pin terminal 8 and the assembly of the insulating housing 3 and the conductive sleeve 4 in a mated installation state.

With reference to FIG. 7A and FIG. 8, an annular boss 32 is provided at an end of the insulating housing 3. A first limiting structure 73 is provided at an inner side of the cover 7, while a mating second limiting structure 35 is provided at an outer side of the annular boss. After the cover 7 is sleeved and mounted onto the annular boss 32, the physical interference of the first limiting structure 73 with the second limiting structure 35 prevents the cover 7 from disengaging from the annular boss 32. In another aspect, as shown in FIG. 8, when the bottom of the cover 7 is in contact with the top of the annular boss 32, the first limiting structure 73 is to be in no contact with the second limiting structure 35. Such configuration of the insulating housing 3 and the cover 7 enables them, after their mated installation, to slide axially and be limited within a predetermined spatial range.

Further, as shown in FIG. 7A and FIG. 7B, the first limiting structure 73 is limiting protrusion(s) 735 at the inner side of the cover 7, while the second limiting structure 35 is limiting recess(es) 325 at the outer side of the annular boss 32. After the cover 7 is sleeved and mounted onto the annular boss 32, the limiting recess(es) 325 is to receive the limiting protrusion(s) 735 and to allow for the axial movement of the limiting protrusion(s) 735 within the limiting recess(es) 325.

Further, as shown in FIG. 2, FIG. 7A, and FIG. 7B, guiding post(s) 72 is provided on the cover 7. The guiding post(s) 72 form protrusion(s) 722 inward from the side wall of the cover 7. The protrusion(s) is to be mated with guiding slot(s) 322 on the annular boss 32 of the insulating housing 3. The mating of the guiding post(s) 72 and the guiding slot(s) 322 is to allow for the axial relative sliding between the cover 7 and the insulating housing 3 after they are inserted together, with a restriction on circumferential relative rotation therebetween.

As shown in FIG. 6 and FIG. 8, the board-end connector 100 comprises the conductive sleeve 4 to be mounted in the insulating housing 3. One end of the conductive sleeve 4 is to be used for mated connection with the insertion body 82 of the pin terminal 8, and the other end of the conductive sleeve 4 is to be used for connection with a terminal in a mating connector (not shown). The conductive sleeve 4 may be provided with an elastic coupling member therein, to establish a slidable electrical connection between the inner wall of the conductive sleeve 4 and the insertion body 82 of the pin terminal 8 when inserted into the sleeve. In FIG. 1, the elastic coupling member is shown as a crown spring 5. One skilled in the art can understand that the elastic coupling member may be a claw, a leaf spring, a torsion spring, or a wire spring, etc.

Figure 9A:
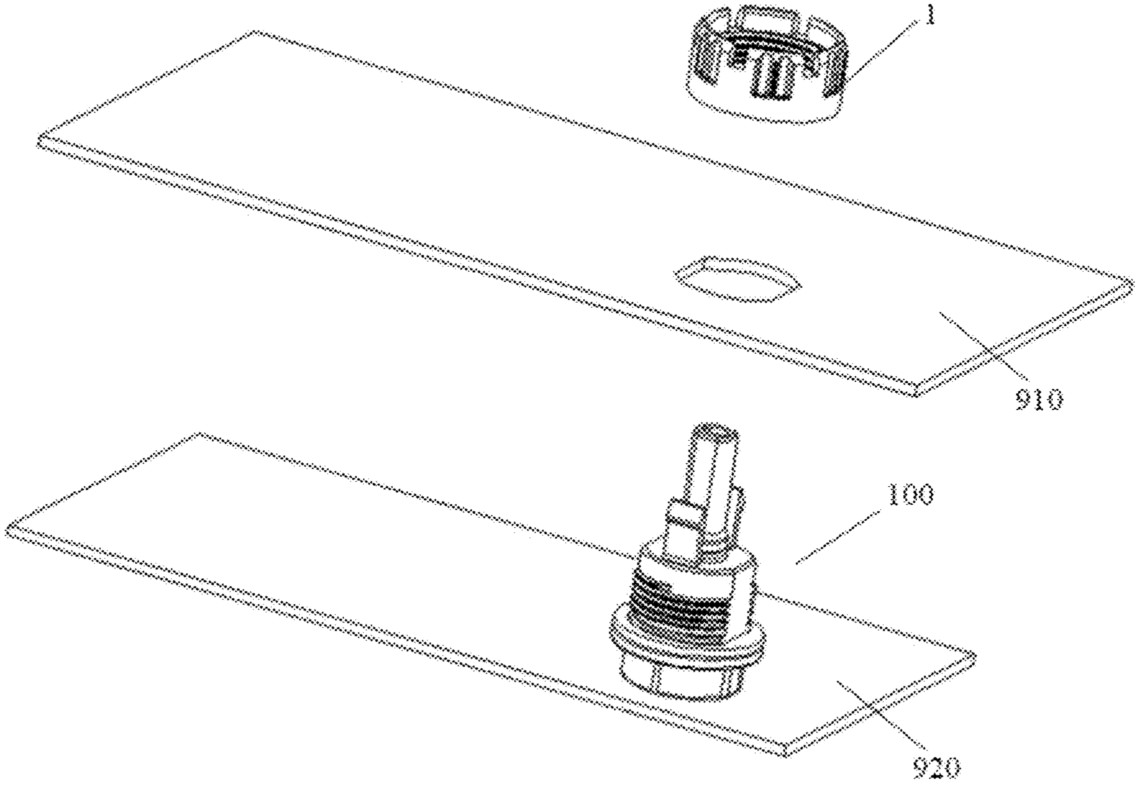
FIG. 9A and FIG. 9B show schematic views of mounting of the board-end connector according to an example of the present disclosure.
Figure 9B:
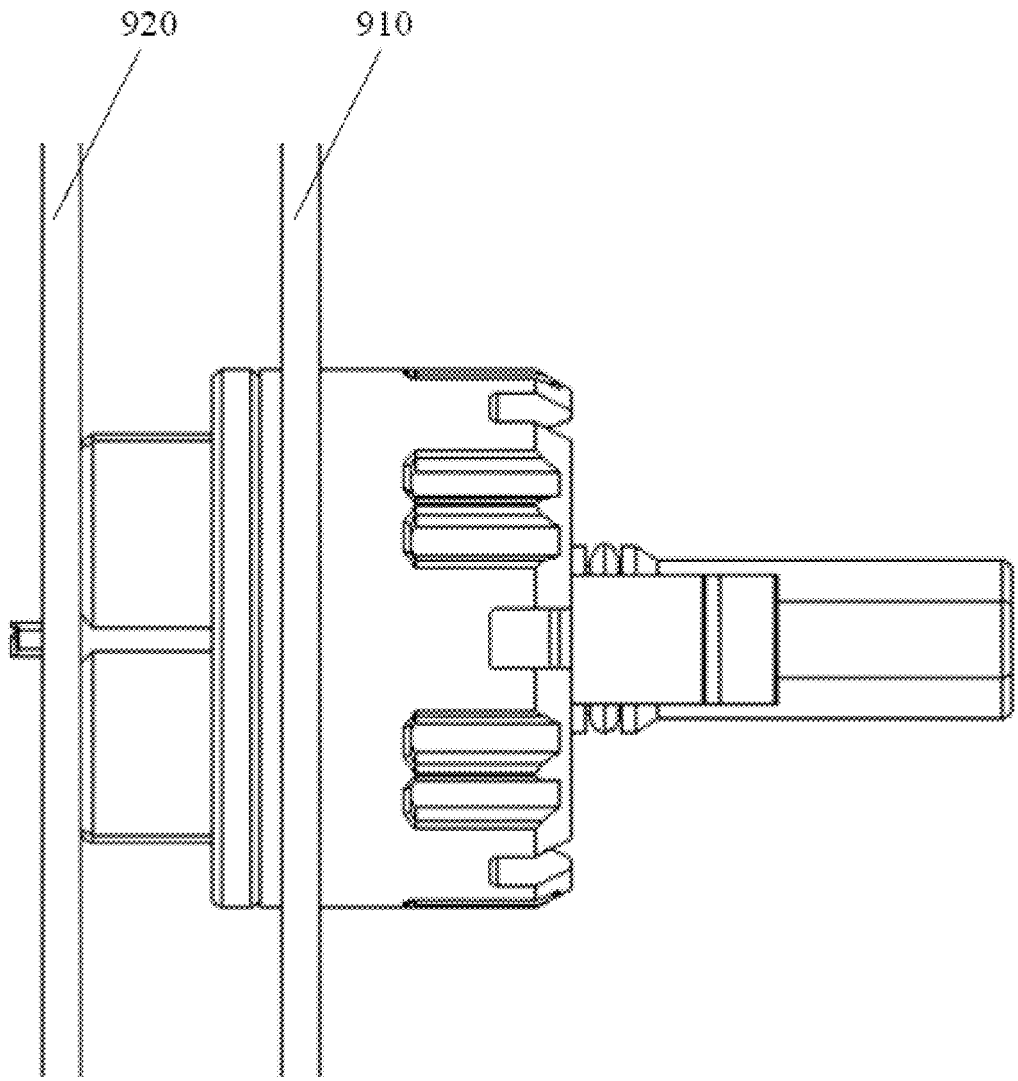

FIG. 9A and FIG. 9B show schematic views of mounting of the board-end connector according to an example of the present disclosure. As shown, the assembly of the board-end connector 100 without the locknut 1 may be fixed to the PCB 920 by soldering. Then, the assembly is mounted to the mounting panel 910, and secured by the locknut 1 at the other side of the panel.

Figure 10A:
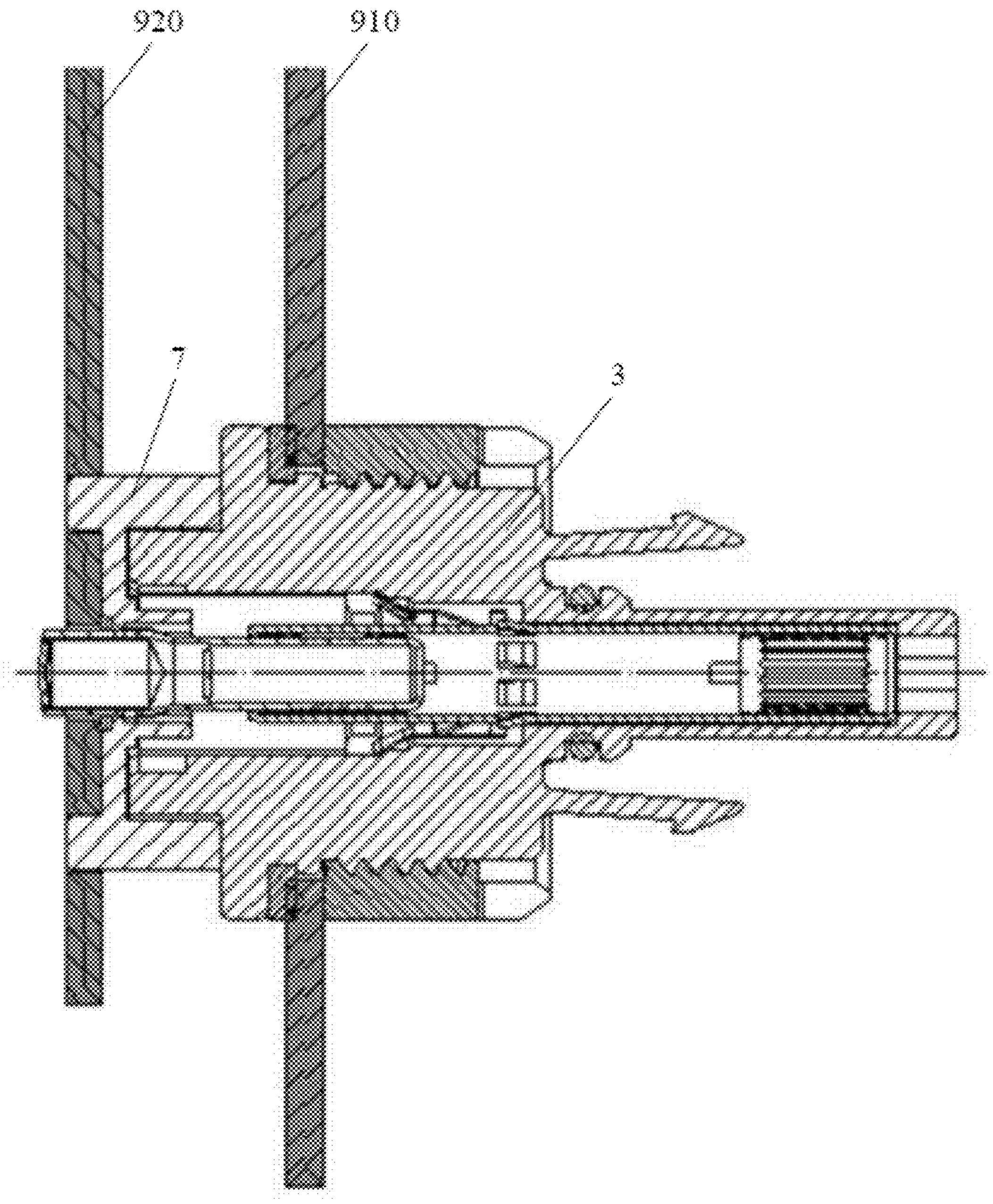
FIG. 10A and FIG. 10B show mounting of the board-end connector according to an example of the present disclosure, with different spacings between the PCB and the mounting panel.
Figure 10B:
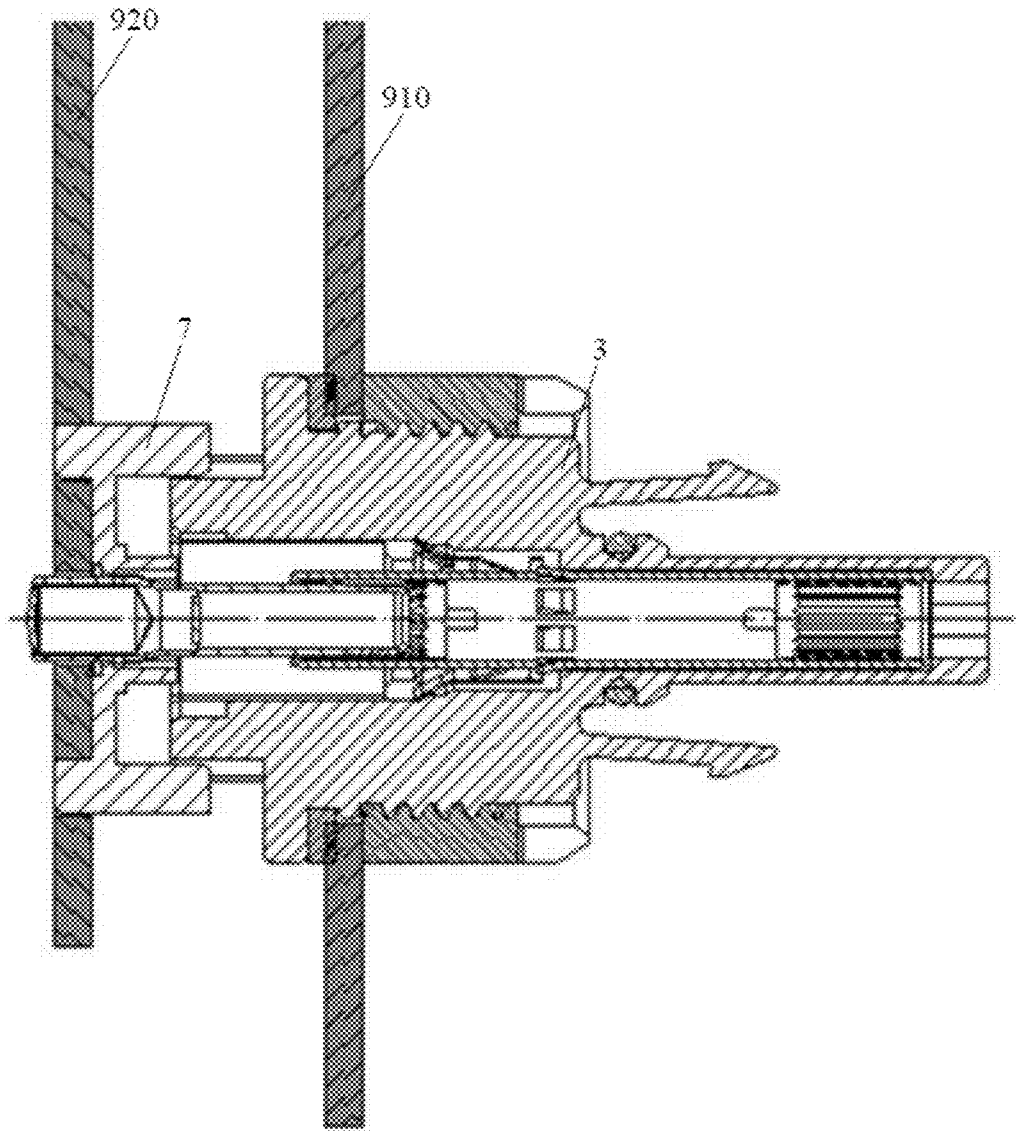

FIG. 10A and FIG. 10B show mounting of the board-end connector according to an example of the present disclosure, with different spacings between the PCB 920 and the mounting panel 910. By comparing the spacing between the PCB 920 and the mounting panel 910 in FIG. 10A and FIG. 10B, it can be seen that in FIG. 10B the spacing is larger. Since the cover 7 and the insulating housing 3 can slide axially and be limited within a predetermined spatial range after their mated installation and the insertion body 82 of the pin terminal 8 can slide in the conductive sleeve 4, the board-end connector 100 can accommodate the installation conditions of FIG. 10B without causing pulling force to the solder joint on the PCB 920.

In the above examples, the pin terminal 8 is used as an example of soldering terminals, though it can be understood that other forms of a terminal having a soldering tail end are also possible.

In the above examples, the sealing washer 2 and the retaining ring 6 are illustrated, though it can be understood that the use of the sealing washer and the retaining ring and the specific form they take do not limit the present disclosure.

In the above examples, the PCB is used as the soldering position of the soldering terminal, though it can be understood that the soldering position of the soldering terminal may be any component in other forms and with other names.

The foregoing has described the basic concepts. Apparently, for one skilled in the art, the above disclosure is only an example and does not limit the present application. Although not explicitly stated herein, one skilled in the art may make various modifications, improvements, and amendments to the present application. Such modifications, improvements, and amendments are proposed in the present application, so these modifications, improvements, and amendments still fall within the spirit and scope of the examples of the present application.

What is claimed is:

1. A board-end connector comprising:

an insulating housing defining openings at a first end and a second end;

a locknut configured to be used for mated installation with the first end of the insulating housing; and a cover configured to be used for mated installation with the second end of the insulating housing by insertion, wherein the cover is configured to receive a first terminal comprising a soldering tail end, and wherein the cover and the second end of the insulating housing, after the mated installation, are configured to slide axially limited within a predetermined spatial range; and wherein the second end of the insulating housing is provided with an annular boss, wherein a first limiting structure is disposed at an inner side of the cover and a mating second limiting structure is disposed at an outer side of the annular boss, and wherein, after the cover is sleeved and mounted onto the annular boss, a physical interference of the first limiting structure and the second limiting structure prevents the cover from disengaging from the annular boss.

2. The board-end connector according to claim 1, wherein the first limiting structure is configured to not be in contact with the second limiting structure when a bottom of the cover is in contact with a top of the annular boss.

3. The board-end connector according to claim 1, wherein the first limiting structure comprises a limiting protrusion at the inner side of the cover and the second limiting structure comprises a limiting recess at the outer side of the annular boss, and wherein, after the cover is sleeved and mounted onto the annular boss, the limiting recess is configured to receive the limiting protrusion and enable an axial movement of the limiting protrusion within the limiting recess.

4. The board-end connector according to claim 1, wherein a first guide structure is disposed on the annular boss and a mating second guide structure is disposed on the cover, and wherein mating of the first guide structure and the second guide structure is configured to enable axial relative sliding between the cover and the insulating housing with a restriction on circumferential relative rotation therebetween.

5. The board-end connector according to claim 4, wherein the first guide structure comprises a guiding slot, and wherein the second guide structure comprises a guiding post.

6. The board-end connector according to claim 1, wherein the soldering tail end of the first terminal is flat shaped, wherein the soldering tail end of the first terminal is larger in width than an insertion body of the first terminal, wherein the cover is provided with a terminal socket in a middle of the cover, and wherein the terminal socket is provided with a pin guiding and limiting structure therein configured to assist in installation guide of the insertion body of the first terminal and to limit an insertion depth of the soldering tail end of the first terminal.

7. The board-end connector according to claim 6, wherein a first ledge structure is provided in the terminal socket and a second ledge structure is provided at the soldering tail end of the first terminal, and wherein the first ledge structure and the second ledge structure are configured to be mated with each other to retain the first terminal.

8. The board-end connector according to claim 1, wherein the board-end connector comprises a conductive sleeve configured to be mounted in the insulating housing, and wherein a first end of the conductive sleeve is configured to be used for mated connection with an insertion body of the first terminal and a second end of the conductive sleeve is configured to be used for connection with a terminal in a mating connector.

9. The board-end connector according to claim 8, wherein the conductive sleeve is provided with an elastic coupling member therein to establish a slidable electrical connection between an inner wall of the sleeve and the insertion body of the first terminal when inserted into the sleeve.

10. The board-end connector according to claim 9, wherein the elastic coupling member is one of a crown spring, a torsion spring, a wire spring, a claw, or a leaf spring.

11. The board-end connector according to claim 1, wherein the first end of the insulating housing corresponds to an end of the board-end connector to be inserted with a mating connector.

12. The board-end connector according to claim 1, wherein the insulating housing is configured to be positioned on a first side of a mounting panel and pass through a positioning hole in the mounting panel, and wherein the locknut is configured to lock the insulating housing to a second side of the mounting panel.

13. A photovoltaic inverting device, the device comprising:

a device case;

a printed circuit board (PCB); and a board-end connector comprising:

an insulating housing defining openings at a first end and a second end;

a locknut configured to be used for mated installation with the first end of the insulating housing; and a cover configured to be used for mated installation with the second end of the insulating housing by insertion, wherein the cover is configured to receive a first terminal comprising a soldering tail end, and wherein the cover and the second end of the insulating housing, after the mated installation, are configured to slide axially limited within a predetermined spatial range;

wherein, the PCB is configured to be positioned inside the device case, and wherein the soldering tail end of the first terminal of the board-end connector is configured to be soldered onto the PCB and the insulating housing of the board-end connector is configured to be mounted onto a panel of the device case; and wherein the second end of the insulating housing is provided with an annular boss, wherein a first limiting structure is disposed at an inner side of the cover and a mating second limiting structure is disposed at an outer side of the annular boss, and wherein, after the cover is sleeved and mounted onto the annular boss, a physical interference of the first limiting structure and the second limiting structure prevents the cover from disengaging from the annular boss.

14. The device of claim 13, wherein the first limiting structure is configured to not be in contact with the second limiting structure when a bottom of the cover is in contact with a top of the annular boss.

15. The device of claim 13, wherein the soldering tail end of the first terminal is flat shaped, wherein the soldering tail end of the first terminal is larger in width than an insertion body of the first terminal, wherein the cover is provided with a terminal socket in a middle of the cover, and wherein the terminal socket is provided with a pin guiding and limiting structure therein configured to assist in installation guide of the insertion body of the first terminal and to limit an insertion depth of the soldering tail end of the first terminal.

16. The device of claim 13, wherein the board-end connector comprises a conductive sleeve configured to be mounted in the insulating housing, and wherein a first end of the conductive sleeve is configured to be used for mated connection with an insertion body of the first terminal and a second end of the conductive sleeve is configured to be used for connection with a terminal in a mating connector.

17. The device of claim 13, wherein the first end of the insulating housing corresponds to an end of the board-end connector to be inserted with a mating connector.

18. The device of claim 13, wherein the insulating housing is configured to be positioned on a first side of a mounting panel and pass through a positioning hole in the mounting panel, and wherein the locknut is configured to lock the insulating housing to a second side of the mounting panel.

19. A board-end connector comprising:

an insulating housing defining openings at a first end and a second end;

a locknut configured to be used for mated installation with the first end of the insulating housing; and a cover configured to be used for mated installation with the second end of the insulating housing by insertion, wherein the cover is configured to receive a first terminal comprising a soldering tail end, and wherein the cover and the second end of the insulating housing, after the mated installation, are configured to slide axially limited within a predetermined spatial range; and wherein the soldering tail end of the first terminal is flat shaped, wherein the soldering tail end of the first terminal is larger in width than an insertion body of the first terminal, wherein the cover is provided with a terminal socket in a middle of the cover, and wherein the terminal socket is provided with a pin guiding and limiting structure therein configured to assist in installation guide of the insertion body of the first terminal and to limit an insertion depth of the soldering tail end of the first terminal.

20. The board-end connector according to claim 19, wherein the board-end connector comprises a conductive sleeve configured to be mounted in the insulating housing, and wherein a first end of the conductive sleeve is configured to be used for mated connection with an insertion body of the first terminal and a second end of the conductive sleeve is configured to be used for connection with a terminal in a mating connector.

* * * * *